US008700326B2

(12) United States Patent
Ruizenaar

(10) Patent No.: US 8,700,326 B2
(45) Date of Patent: Apr. 15, 2014

(54) NAVIGATION SYSTEM, NAVIGATION DEVICE, NAVIGATION SERVER, VEHICLE PROVIDED WITH A NAVIGATION DEVICE, GROUP OF SUCH VEHICLES AND NAVIGATION METHOD

(75) Inventor: Marcel Gregorius Anthonius Ruizenaar, Zoetermeer (NL)

(73) Assignee: Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 98 days.

(21) Appl. No.: 13/511,857

(22) PCT Filed: Nov. 18, 2010

(86) PCT No.: PCT/NL2010/050771
§ 371 (c)(1),
(2), (4) Date: Jun. 29, 2012

(87) PCT Pub. No.: WO2011/065818
PCT Pub. Date: Jun. 3, 2011

(65) Prior Publication Data
US 2012/0265441 A1   Oct. 18, 2012

(30) Foreign Application Priority Data
Nov. 24, 2009   (EP) .................................... 09176965

(51) Int. Cl.
*G01C 21/08* (2006.01)
(52) U.S. Cl.
USPC ........................................................ 701/525
(58) Field of Classification Search
USPC .................. 701/400, 449, 500, 525
See application file for complete search history.

(56) References Cited

U.S. PATENT DOCUMENTS

| 5,463,313 | A | 10/1995 | Berkcan |
| 6,801,855 | B1 | 10/2004 | Walters et al. |
| 2003/0158665 | A1 | 8/2003 | McCall et al. |
| 2009/0082966 | A1 | 3/2009 | Sato |

FOREIGN PATENT DOCUMENTS

| DE | 3910912 | 10/1990 |
| FR | 2914739 | 10/2008 |
| GB | 195088 | 5/1924 |
| JP | 11095835 | 4/1999 |

*Primary Examiner* — Mary Cheung
(74) *Attorney, Agent, or Firm* — Preti Flaherty Beliveau & Pachios LLP

(57) ABSTRACT

A navigation system is disclosed comprising a navigation device (2a) with a navigation sensor unit (3) and a magnetic field sensor unit (4), the navigation device is arranged to be moved. The navigation sensor unit (3) is arranged for providing a navigation signal with navigation information ($\bar{a}$, θ). The magnetic field sensor unit is arranged for providing a magnetic field signal (H) indicative for a magnetic field strength. The navigation system further comprises a first integration unit (6a) for integrating the navigation signal ($\bar{a}$, θ) and for providing a first integration result (p), a second integration unit (6b) for calculating a path-integral of the magnetic field signal using the navigation signal, and for providing a second integration result (m), a first auxiliary integration unit (6c) for providing a first coefficient (α), a second auxiliary integration unit (6d) for providing a second coefficient (φ), and a proximity detector (5) for providing a proximity signal (Snc) indicative whether a distance between the navigation device (2a) and a reference position is less than a predetermined value. A matrix solving unit (8) for solves a set of equations based on the first integration result, the second integration result, the first coefficient and the second coefficient.

21 Claims, 11 Drawing Sheets

NAVIGATION SYSTEM, NAVIGATION DEVICE, NAVIGATION SERVER, VEHICLE PROVIDED WITH A NAVIGATION DEVICE, GROUP OF SUCH VEHICLES AND NAVIGATION METHOD

BACKGROUND

1. Field of the Invention

The present invention relates to a navigation system.
The present invention further relates to a navigation device.
The present invention further relates to a navigation server.
The present invention further relates to a vehicle provided with a navigation device.
The present invention further relates to a group of such vehicles.
The present invention relates to a navigation method.

2. Related Art

Nowadays GPS navigation facilities are available that can relatively accurate determine a position of a vehicle. However, in some circumstances alternative navigation methods are required as satellite signals required for GPS-navigation are not always available, for example at locations below sea level and in buildings. One such alternative method applies dead-reckoning using data obtained from odometers or inertial sensors, for instance gyroscopes and accelerometers. Gyroscopes provide information about the orientation of the vehicle and accelerometers provide information about its acceleration. If the initial position and velocity of a vehicle are known, its momentaneous velocity and position can be estimated by numerical integration of the acceleration and orientation data obtained from the accelerometers and gyroscopes. Generally accelerometers have a systematic error, also denoted as bias, resulting in a drift in position indication, exponential in time. Accordingly, such navigation devices based on inertial sensors need to be calibrated periodically to measure and compensate the sensor biases. With low-cost sensors, and without bias compensation, the navigation solution becomes useless within minutes.

This also applies to dead reckoning methods using other sensors, e.g. odometers for measuring speed and a compass for measuring direction.

Also systems are known that use a combination of GPS-navigation and navigation by dead-reckoning. For example U.S. Pat. No. 6,801,855 provides systems and methods for complementary navigation devices with various integrated positioning functionality. In particular the navigation method includes providing a first navigation device having a triangulation positioning functionality and providing a second navigation device adapted to communicate with the first navigation device. The second navigation device includes one or more dead reckoning positioning components. The one or more dead reckoning positioning components are used in complement to the triangulation positioning functionality to determine the position when the triangulation positioning functionality is degraded. In the known systems and methods the first and the second navigation device are arranged in a single vehicle.

In case navigation on the basis of inertial sensing, inaccuracies result from a bias in the measured acceleration. This bias may have several causes, some of them are:
1. A bias caused by the accelerometers.
2. A bias in the measurement of the orientation. The latter bias is due to imperfections of the gyroscopes, internal alignment errors in the navigation device and orientation initialization errors of the navigation device.

SUMMARY OF THE INVENTION

It is a purpose of the invention to provide for means that enable an at least partial estimation of the bias in the measured acceleration, even in the absence of accurate position measurements by GPS.

According to a first aspect of the invention a navigation system is provided comprising a navigation device with a navigation sensor unit and a magnetic field sensor unit, wherein, the navigation device being arranged to be moved, the navigation sensor unit is arranged for providing a navigation signal, the magnetic field sensor unit is arranged for providing a magnetic field signal indicative for a magnetic field strength, a first integration unit for integrating the navigation signal and for providing a first integration result (p), a second integration unit for calculating a path-integral of the magnetic field signal using the navigation signal, and for providing a second integration result (m), a first auxiliary integration unit for providing a first coefficient ($\alpha$), a second auxiliary integration unit for providing a second coefficient ($\phi$), a proximity detector for providing a proximity signal indicative whether a distance between the navigation device and a reference position is less than a predetermined value, a data storage unit for storing the first integration result, the second integration result, the first coefficient and the second coefficient for states wherein the proximity is positive, a matrix solving unit for solving a set of equations based on the first integration result, the second integration result, the first coefficient and the second coefficient retrieved from the data storage unit, a controller for controlling the first integration unit, the second integration unit, the first auxiliary integration unit, the second auxiliary integration unit, the data storage unit and the matrix solving unit.

According to a second aspect of the invention a navigation device is provided comprising a navigation device with a navigation sensor unit, a magnetic field sensor unit, and a proximity detector, wherein the navigation device is arranged to be moved, the navigation sensor unit being arranged for providing a navigation signal, the magnetic field sensor unit being arranged for providing a magnetic field signal indicative for a magnetic field strength, the proximity detector being arranged for providing a proximity signal indicative whether a distance between the navigation device and a reference position is less than a predetermined value.

An embodiment of the navigation device (2a) according to the second aspect further comprises a communication unit (10), wherein the communication unit (10) of the navigation device (2a) transmits the sensor signals $\bar{a}$, $\theta$ indicative respectively for the measured acceleration and the measured orientation, the signal (H) indicative for the magnetic field and the signal (Snc) indicating whether an encounter has been detected or not.

According to a third aspect of the invention a navigation server is provided comprising a data storage unit for storing a first integration result obtained from a first integration unit for integrating a navigation signal, a second integration result obtained from a second integration unit for calculating a path-integral of the magnetic field signal using the navigation signal, a first coefficient obtained from a first auxiliary integration unit and a second coefficient obtained from a second auxiliary integration unit, a matrix solving unit for solving a set of equations based on the first integration result, the second integration result, the first coefficient and the second coefficient retrieved from the data storage unit, a controller for controlling the first integration unit, the second integration unit, the first auxiliary integration unit, the second auxiliary integration unit, the data storage unit and the matrix solving unit.

A navigation system according to the first aspect of the invention may be formed by a single navigation device, by a plurality of cooperating navigation devices or by a plurality of navigation devices that cooperate with a navigation server.

In embodiments the navigation system according to the first aspect, the navigation device according to the second aspect and/or the navigation device according to the third aspect are characterized in that the first integration result ($\bar{p}$) is an estimated position, the second integration result (m) is Ampere's integral of the magnetic field signal ($\bar{H}$) along the path ($O_1$-$O_2$) followed by the navigation system as estimated on the basis of the navigation signal ($\bar{a}$, $\theta$), the first auxiliary integration unit (6c) obtains the first coefficient ($\alpha$) by a double integration of a normalization constant in time over a time-interval ($T_1$-$T_2$) in which the estimated path was followed, the second auxiliary integration unit (6d) is arranged for integrating a normalization constant (I) in time over said time-interval, for multiplying an integration result obtained therewith by the measured magnetic field (H) and for integrating the product obtained therewith in time over said time-interval, wherein the integration result of this integration is the second coefficient ($\bar{\phi}$), wherein the set of equations includes at least a first equation in which the estimated position ($p_1^1$) is expressed as the product of the first coefficient ($\alpha$) with a bias ($\bar{b}$) in the acceleration, and a second equation wherein Ampere's integral is expressed as the product of said bias ($\bar{b}$) with the second coefficient ($\bar{\phi}$), and wherein the matrix solving unit (8) estimates said bias by solving the set of equations.

According to a fourth aspect of the invention a vehicle is provided that comprises a navigation device according to the first aspect of the invention. The operation of the vehicle may be controlled by a human that uses the navigation device to determine his position or by a automatic controller.

According to a fifth aspect of the invention a group of vehicles according to the fourth aspect of the invention is provided, the vehicles having mutually cooperating navigation devices.

According to a sixth aspect of the invention a method for navigating is provided comprising the steps of providing a navigation signal with navigation information, providing a magnetic field signal indicative for a magnetic field strength, integrating the navigation signal and providing a first integration result (p), determining a path integral of magnetic field signal using the navigation signal and providing a second integration result (m), carrying out a first auxiliary integration resulting in a first coefficient ($\alpha$), carrying out a second auxiliary integration resulting in a second coefficient ($\phi$), providing a proximity signal indicative whether a distance between the navigation device and a reference position is less than a predetermined value, for storing the first integration result, the second integration result, the first reference integration result and the second reference integration result for states wherein the proximity is positive, solving a set of equations based on the first integration result, the second integration result, the first reference integration result and the second reference integration result retrieved from the data storage unit.

An embodiment of the method according to the sixth aspect is characterized in that the first integration result ($\bar{p}$) is an estimated position, the second integration result (m) is Ampere's integral of the magnetic field signal ($\bar{H}$) along the path ($O_1$-$O_2$) followed by the navigation system as estimated on the basis of the navigation signal ($\bar{a}$, $\theta$), the first auxiliary integration obtains the first coefficient ($\alpha$) by a double integration of a normalization constant in time over a time-interval ($T_1$-$T_2$) in which the estimated path was followed, the second auxiliary integration comprises integrating a normalization constant (I) in time over said time-interval, multiplying an integration result obtained therewith by the measured magnetic field (H) and integrating the product obtained therewith in time over said time-interval, wherein the integration result of this integration is the second coefficient ($\bar{\phi}$), wherein the set of equations includes at least a first equation in which the estimated position ($p_1^1$) is expressed as the product of the first coefficient ($\alpha$) with a bias ($\bar{b}$) in the acceleration, and a second equation wherein Ampere's integral is expressed as the product of said bias ($\bar{b}$) with the second coefficient ($\bar{\phi}$), and wherein said bias is estimated by solving the set of equations.

Two navigation devices are considered to be in each others proximity if they are within a predetermined range with respect to each other. The predetermined range depends on the required accuracy and on the practical means that are used to detect the encounter. For example the predetermined range may coincide with the detection range of an RFID detector. The predetermined range may for example be a sphere having a predetermined radius. Any object within that sphere will be considered as being within the predetermined range. Said predetermined radius may for example be in the order of 50 cm to 10 meter. With a substantially smaller radius, e.g. 10 cm, the probability that two vehicles spontaneously encounter each other is relatively small. Therewith also the amount of information that can be exchanged and that can be used to improve the estimation accuracy is small. However, in case that deliberate encounters between the vehicles are arranged, this is not a problem. In that case the detection radius may be relatively small if desired. If the radius is much larger than 10 m, e.g. 50 m, the accuracy improvement is relatively small. Also situations are possible wherein a substantially larger radius may be acceptable. A submarine vessel having an accuracy of 1% will have a navigation error of 1 km after a travelled distance of 100 km. In that case an encounter with another submarine vessel also having a navigation device at a distance of 100 m may still be considered as proximate. It is true that an error is made by assuming that the navigation devices of the two encountering submarine vessels are at the same position, and consequently this error will also cause an error in the estimation of the bias factors of the navigation systems. However, as the error (100 m) made in this assumption is substantially smaller than the practically occurring navigation errors (1 km), still a more accurate estimation of the bias factors is obtained, therewith improving navigation accuracy. Likewise, navigating robots in a building may have a navigation error incrementing to tens of meters. In that case a distance of some meters may be considered proximate. It is sufficient that the navigation device has some binary decision facility that determines whether an other navigation system is proximate or not and, if the other navigation device is considered proximate, then it is assumed that the positions estimated by the encountering navigation devices are estimations for the same position, and the navigation information of the other navigation device is used, if the other navigation device is not considered proximate, the navigation information of the other navigation device is not used. (Although earlier stored navigation relating to earlier encounters stored by the other navigation device may be used.)

BRIEF DESCRIPTION OF THE DRAWINGS

These and other aspects are described in more detail with reference to the drawing. Therein.

DETAILED DESCRIPTION OF EMBODIMENTS

Figure 1:
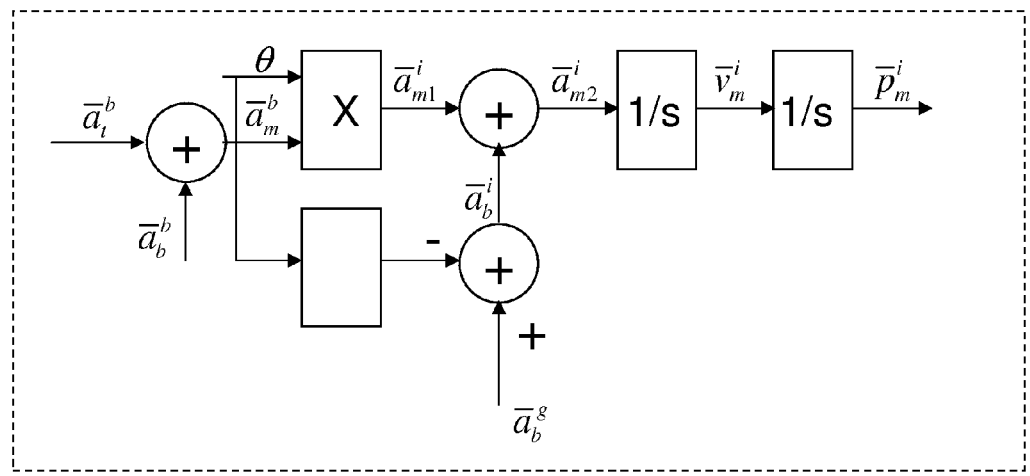
FIG. 1 schematically illustrates various signals involved in inertial navigation, FIG. 2 schematically illustrates a first embodiment of a navigation system according to the first aspect of the invention.

In the following detailed description numerous specific details are set forth in order to provide a thorough understanding of the present invention. However, it will be understood by one skilled in the art that the present invention may be practiced without these specific details. In other instances, well known methods, procedures, and components have not been described in detail so as not to obscure aspects of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, and/or sections, these elements, components, and/or sections should not be limited by these terms. These terms are only used to distinguish one element, component or section from another element, component, and/or section. Thus, a first element, component, and/or section discussed below could be termed a second element, component, and/or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. All publications, patent applications, patents, and other references mentioned herein are incorporated by reference in their entirety. In case of conflict, the present specification, including definitions, will control. In addition, the materials, methods, and examples are illustrative only and not intended to be limiting.

FIG. 1 schematically illustrates various signals involved in inertial navigation. An inertial navigation device is arranged in a body frame that is moved relatively to an inertial frame with a (true) acceleration expressed in the body frame axis system $\bar{a}_t^b$. The navigation device has a sensor (a set of accelerometers) that provides an output signal indicative for the measured acceleration expressed in the body frame axis system $\bar{a}_m^b$. Due to an unknown bias expressed in the body frame axis system $\bar{a}_b^b$ on the output of the accelerometers, the measured acceleration $\bar{a}_m^b$ deviates from the true acceleration $\bar{a}_t^b$. To take into account the orientation of the sensor, the acceleration signal measured by the sensor is multiplied with a rotation matrix θ, usually obtained from a set of gyroscopes that is representative for the orientation of the sensor fixed to the body frame with respect to the inertial frame axis system. This results in an output signal indicative for a measured acceleration expressed in the inertial frame axis system $\bar{a}_{m1}^i$. Usually this signal is biased by a second error source $\bar{a}_b^i$, which is due to incomplete compensation of gravitation effects $\bar{a}_b^g$ caused by unknown offsets in orientation indication. This results in a biased output signal $\bar{a}_{m2}^i$. This signal is integrated twice to obtain successively an estimation of the velocity $\bar{v}_m^i$ and of the position $\bar{p}_m^i$ of the object with respect to the inertial frame.

Figure 2:
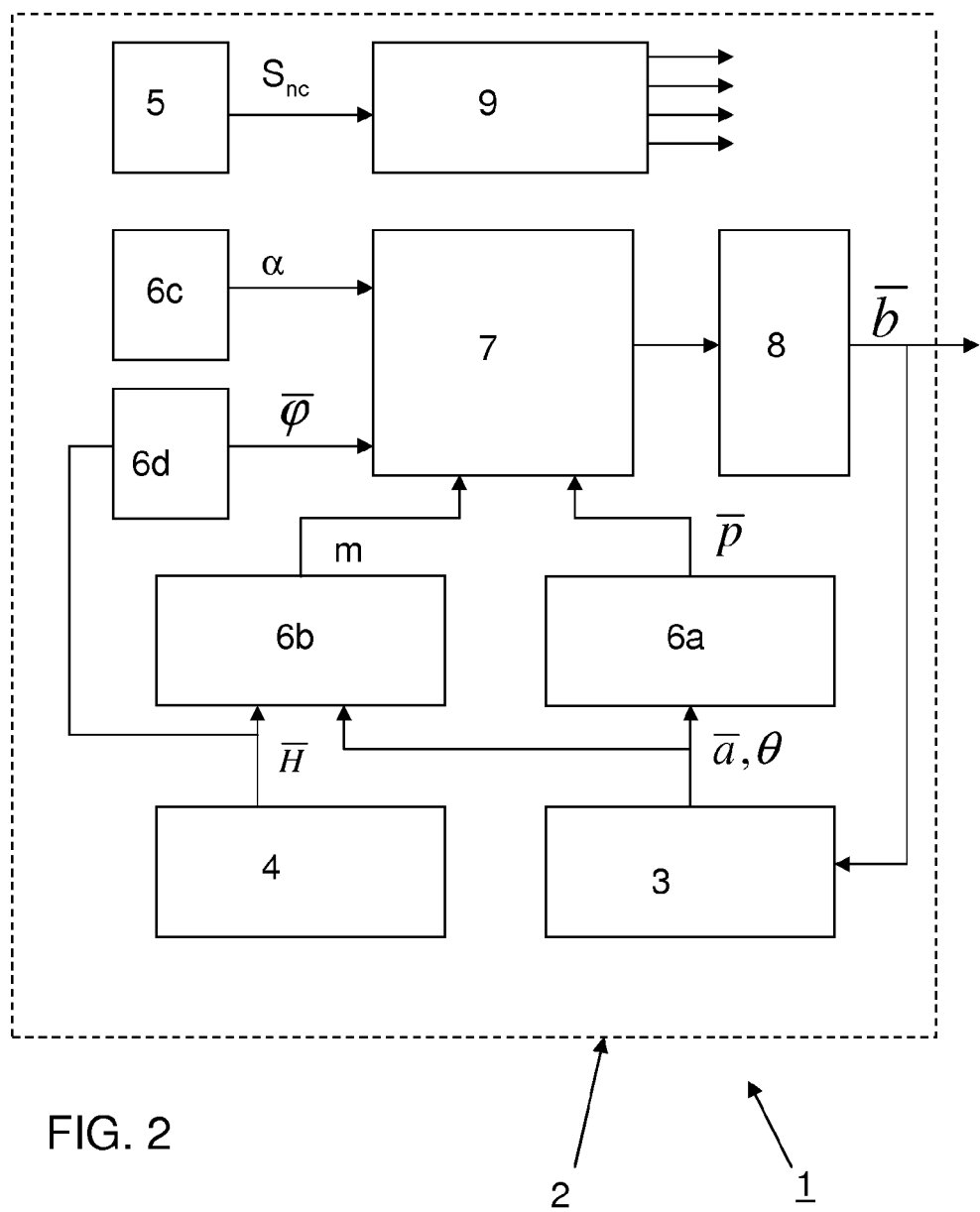

FIG. 2 illustrates a navigation device according to the second aspect of the invention. The navigation device 2 comprises a navigation sensor unit 3, a magnetic field sensor unit 4, and a proximity detector 5. The navigation device 2 is arranged to be moved.

The navigation sensor unit 3 is arranged for providing a navigation signal $\bar{a}$, θ.

The magnetic field sensor unit 4 is arranged for providing a magnetic field signal H indicative for a magnetic field strength.

The proximity detector 5 is arranged for providing a proximity signal $S_{nc}$ indicative whether a distance between the navigation device 2 and a reference position is less than a predetermined value. The reference position may be determined by a fixed beacon that is recognized by the proximity detector, e.g. from a particular visual pattern or from a signal transmitted by the beacon. However the reference position may alternatively be provided by a moving object, e.g. provided with a further navigation device as will be described in more detail in another part of this application.

The navigation device shown in FIG. 2 further comprises a first integration unit 6a for integrating the navigation signal and for providing a first integration result ($\bar{p}$). The navigation device of FIG. 2 additionally comprises a second integration unit 6b for calculating a path-integral of the magnetic field signal using the navigation signal, and for providing a second integration result (m). The navigation device 2 of FIG. 2 further comprises a first and a second auxiliary integration unit 6c, 6d for providing a first coefficient (α) and a second coefficient ($\bar{\phi}$) respectively.

In particular the navigation device 2 shown in FIG. 2 forms a complete navigation system 1 according to the first aspect of the invention. To that end it further comprises data storage unit 7 for storing the first integration result $\bar{p}$, the second integration result m, the first coefficient α and the second coefficient $\bar{\phi}$ for states wherein the proximity signal $S_{nc}$ is positive.

It further comprises a matrix solving unit 8 for solving a set of equations based on the first integration result $\bar{p}$, the second integration result m, the first coefficient α, and the second coefficient $\bar{\phi}$ retrieved from the data storage unit 7.

The navigation system 1 also comprises a controller 9 for controlling the first integration unit 6a, the second integration unit 6b, the first auxiliary integration unit 6c, the second auxiliary integration unit 6d, the data storage unit 7 and the matrix solving unit 8.

By solving the set of equations the matrix solving unit 8 estimates biases $\bar{b}$ in the navigation sensor unit 3. The estimation for the biases may be used by the navigation sensor unit 3 to correct these biases and to improve the accuracy of the navigation signals $\bar{a}$, θ.

Figure 3:
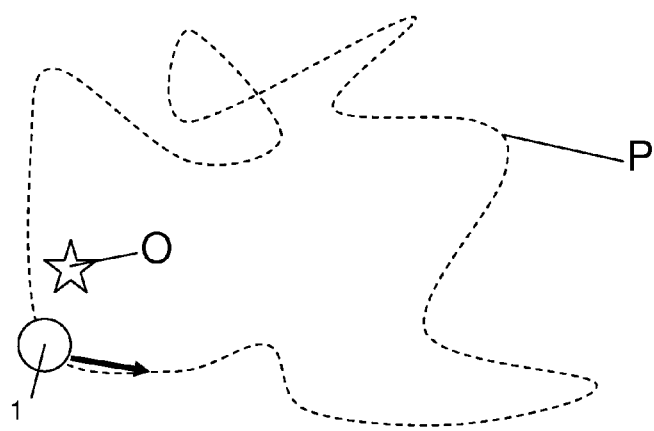
FIG. 3 illustrates operation of the navigation system of FIG. 2, FIG. 4 schematically illustrates a second embodiment of a navigation system according to the first aspect of the invention, FIG. 5 schematically illustrates a first embodiment of a navigation device according to the second aspect of the invention, applicable in the navigation system of FIG. 4.

The operation of the navigation system 1 is now illustrated in more detail with reference to FIG. 3. FIG. 3 shows a beacon (star) at origin O of a terrain that is traversed by a carrier of the navigation device 1. When it is detected by the proximity detector 5 of the navigation system 1 that it is close to the beacon, it issues a positive signal $S_{nc}$ indicative for this event.

Detection of this event signals the controller that the actual position of the navigation device 2 is within a radius of said predetermined value from the position of the beacon.

When this event is detected, again after the navigation device 2 has followed an arbitrary path P, it is possible to estimate a bias as follows.

According to the law of Ampere, the closed loop integral over the magnetic field $\bar{H}$ equals the current I through the closed curve.

$$\oint \bar{H} \cdot d\bar{s} = I$$

In normal navigation situations the DC-value for the current I is 0. The magnetic field $\bar{H}$ relates to the magnetic induction $\bar{B}$ by the relation:

$$\bar{H} = \frac{\bar{B}}{\mu_0 \cdot \mu_r},$$

wherein $\mu_0$ is the magnetic permittivity in vacuum and $\mu_r$ is the relative magnetic permeability.

The magnetic induction $\bar{B}$ is measurable with a magnetometer, which is usually fixed with respect to the body frame axis system. The information from the gyroscopes can for instance be used to transform these measurements to an inertial frame axis system.

Between two detections of an encounter of the navigation device with the beacon the second integration unit 6b evaluates Ampere's integral for the path followed in the time interval between these detections at positions $O_1$, $O_2$ close to origin O. This results in:

$$m = \int_{O_1}^{O_2} \bar{H} d\bar{s} =$$

$$\int_{O_1}^{O_2} \bar{H} \cdot \bar{v} dt = \int_{O_1}^{O_2} \bar{H} \cdot (\bar{v}^t + \bar{v}^e) dt = \int_{O_1}^{O_2} \bar{H} \cdot \bar{v}^t dt + \int_{O_1}^{O_2} \bar{H} \cdot \bar{v}^e dt$$

Therein $\bar{v}$, $\bar{v}^t$, $\bar{v}^e$ respectively are the measured velocity, the true velocity, and the error in the measured velocity with reference to the inertial frame for the first vehicle.

Therein, according to Ampere's law the first terms is substantially 0, so that:

$$m = \int_{O_1}^{O_2} \bar{H} \cdot \bar{v}^e dt$$

Therein $\bar{v}^e = \int \bar{b} \, dt$
Therein, $\bar{b}$ is the additional bias in the acceleration ($\bar{a}_b^i$):
Accordingly:

$$m = \int_{O_1}^{O_2} \bar{H} \int_{T_1}^{T_2} \bar{b} \, dt \, dt$$

It can be shown that the factors $\bar{b}_1$ can be brought outside the integral, resulting in:

$$m = \bar{b} \int_{O_1}^{O_2} \bar{H} \int_{T_1}^{T_2} I \, dt \, dt$$

Therein I is the unity matrix. Note that inside the integral, a vector dot-product is evaluated, resulting in a scalar. As the bias-vector is taken outside the integrals, the unity matrix is required to make sure the calculations are done in the correct order.

Therewith the difference reduces to:

$$m = \bar{b} \cdot \bar{\varphi} \qquad (1),$$

Wherein the term $$\bar{\varphi} = \int_{O_1}^{O_2} \bar{H} \int_{T_1}^{T_2} I \, dt \, dt$$

is evaluated by auxiliary integration unit 6d.

Additionally the first integration unit 6a estimates the position $\bar{p}$ of the navigation device 2. In this connection the following relation applies.

$$\bar{p} = \int_{T_1}^{T_2} \int (\bar{a}^t + \bar{b}) dt \, dt = \int_{T_1}^{T_2} \int \bar{a}^t \, dt \, dt + \int_{T_1}^{T_2} \int \bar{b} \, dt \, dt$$

Therein $\bar{p}$ is an estimation of the relative position of $O_2$ as compared to $O_1$.

$O_1$ and $O_2$ approximately coincide, the first term may be neglected, so that the equation for $\bar{p}$ reduces approximately to:

$$\bar{p} = \bar{b} \int_O^{P_1,L_1} \int dt \, dt$$

This equals to $$\bar{p} = \bar{b} \cdot \alpha \qquad (2)$$

Therein the term $$\alpha = \int_{T_1}^{T_2} \int dt \, dt$$

is evaluated by integration unit 6c. This integration reduces to $$\alpha = \int_{T_1}^{T_2} \int dt \, dt = \frac{1}{2}(T_2^2 - T_1^2)$$

Presuming that the vehicles follow a path within a plane, then equation 2 defines a set of two equations with 2 unknown factors ($b_x$, $b_y$).

Equation 1 is an independent equation with the same two unknown factors. Although equation 2 by itself is sufficient to estimate the unknown bias, an improved estimation thereof can be obtained evaluating the solution of the system of 3 equations obtained by including equation 1. Solving such an overdetermined set of equations can for instance be done using standard "least squares" algorithms as known to a skilled person.

Figure 4:
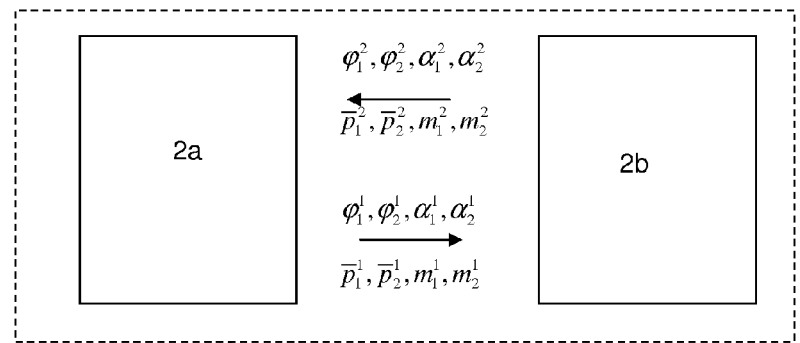

FIG. 4 schematically shows an alternative navigation system 1 that comprises a set of two cooperating navigation devices 2a, 2b. One of the navigation devices 2a is shown in more detail in FIG. 5. The other navigation device 2b may have a similar construction. In this embodiment it is not necessary that the reference position is a fixed position. Here the navigation devices provide each others reference position.

Figure 5:
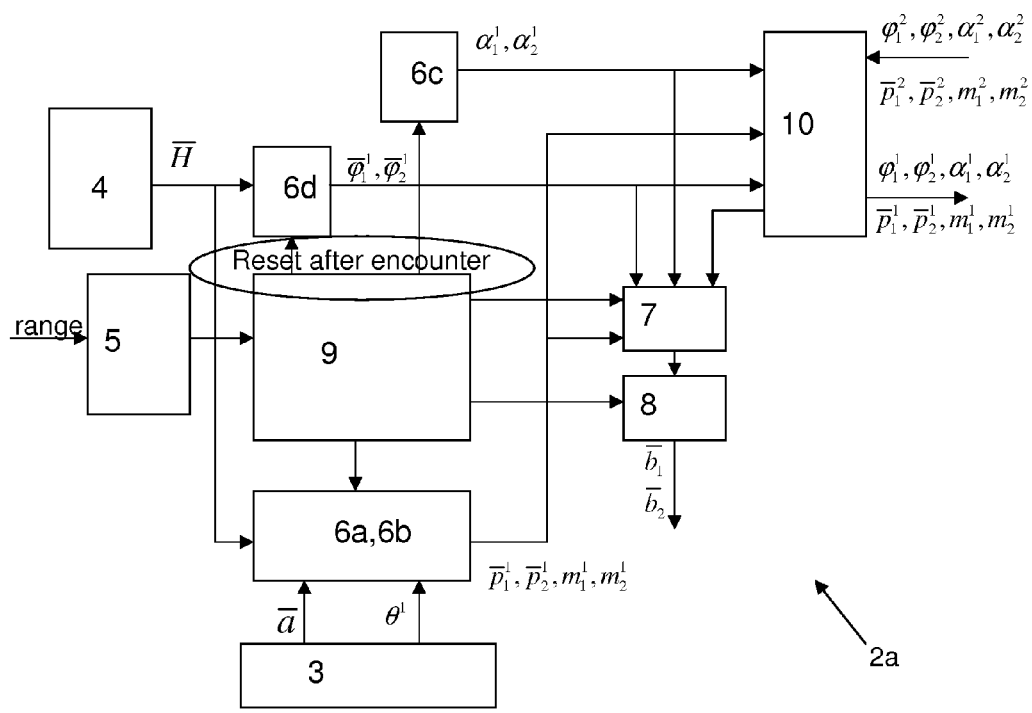

In addition to the parts shown for the embodiment shown for the navigation device of FIG. 2 the navigation device 2a of FIG. 5 comprises a communication unit 10 with which it can communicate navigation information with other navigation devices, e.g. navigation device 2b in FIG. 4. This allows the navigation devices 2a, 2b to jointly determine a bias correction as is described more in detail below.

Figure 6:
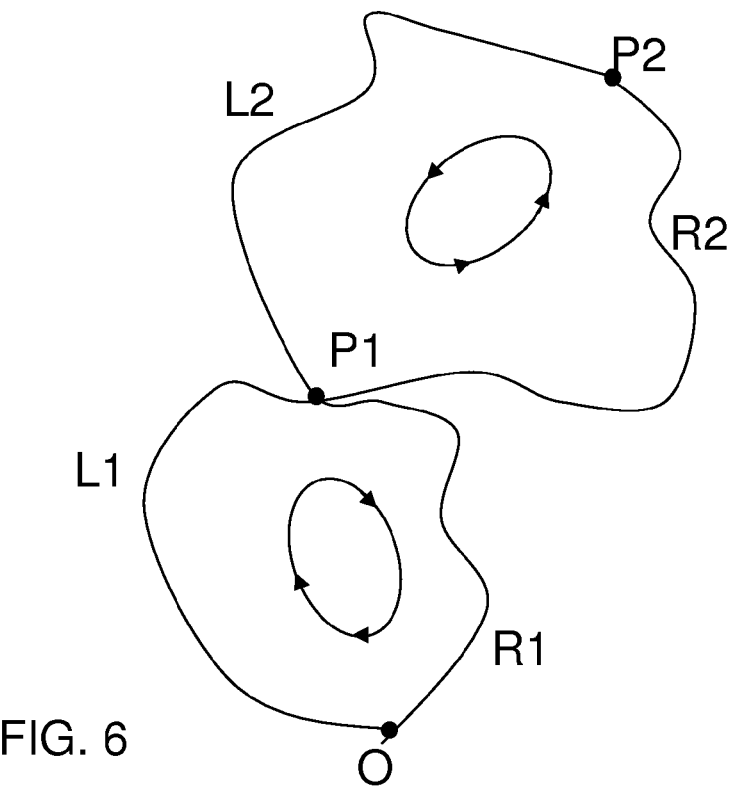
FIG. 6 illustrates operation of the navigation system of FIG. 4 and the navigation device of FIG. 5.

FIG. 6 shows the situation wherein two carriers that are each provided with a navigation device 2a, 2b start in the origin O. For this example it is presumed that the carriers are vehicles, but alternatively it is possible that the carriers are persons, for example firemen. Alternatively, it is possible that one navigation device is carried by a vehicle and the other by a person. In this example vehicle 1 follows path L1 to P1 and meets vehicle 2 that followed path R1 to P1. Subsequently vehicles meet each other again after having followed paths L2, R2 respectively. Paths L1 and R1 together define a first closed trajectory. Likewise paths L2 and R2 together define a second closed trajectory Now the second integration unit 6b of each of the navigation devices 2a, 2b evaluates Ampere's integral for its part of the curve: For the first vehicle that travels from point O to point P1 via path L1 this results in:

$$m_1 = \int_O^{P_1,L_1} \bar{H}_1 d\bar{s}_1 = \int_O^{P_1,L_1} \bar{H}_1 \cdot \bar{v}_1 dt =$$
$$\int_O^{P_1,L_1} \bar{H}_1 \cdot (\bar{v}_1^t + \bar{v}_1^e) dt = \int_O^{P_1,L_1} \bar{H}_1 \cdot \bar{v}_1^t dt + \int_O^{P_1,L_1} \bar{H}_1 \cdot \bar{v}_1^e dt$$

Therein $\bar{v}_1$, $\bar{v}_1^t$, $\bar{v}_1^e$ respectively are the true velocity, the measured velocity, and the error in the measured velocity with reference to the inertial frame for the first vehicle.

Similarly for the second vehicle that follows path R1:

$$m_2 = \int_O^{P_1,R_1} \bar{H}_2 \cdot \bar{v}_2^t dt + \int_O^{P_1,R_1} \bar{H}_2 \cdot \bar{v}_2^e dt$$

Therein $\bar{v}_2^t$, $\bar{v}_2^e$ respectively are the true velocity and the error in the measured velocity with reference to the inertial frame for the second vehicle.

From the combination it follows:

$$m_1 - m_2 = \int_O^{P_1,L_1} \bar{H}_1 \cdot \bar{v}_1^t dt -$$
$$\int_O^{P_1,R_1} \bar{H}_2 \cdot \bar{v}_2^t dt + \int_O^{P_1,L_1} \bar{H}_1 \cdot \bar{v}_1^e dt - \int_O^{P_1,R_1} \bar{H}_2 \cdot \bar{v}_2^e dt$$

Therein, according to Ampere's law the sum of the first two terms is 0, so that:

$$m_1 - m_2 = \int_O^{P_1,L_1} \overline{H}_1 \cdot \overline{v}_1^e dt - \int_O^{P_1,R_1} \overline{H}_2 \cdot \overline{v}_2^e dt$$

Therein $\overline{v}_1^e = \int \overline{b}_1 dt$ and $\overline{v}_2^e = \int \overline{b}_2 dt$ Therein, $\overline{b}_1$ and $\overline{b}_2$ is the additional bias for both vehicles ($\overline{a}_b^i$):

Accordingly:

$$m_1 - m_2 = \int_O^{P_1,L_1} \overline{H}_1 \cdot \int \overline{b}_1 dt dt - \int_O^{P_1,R_1} \overline{H}_2 \cdot \int \overline{b}_2 dt dt$$

It can be shown that the factors $\overline{b}_1$ and $\overline{b}_2$ can be brought outside the integral, resulting in:

$$m_1 - m_2 = \overline{b}_1 \int_O^{P_1,L_1} \overline{H}_1 \cdot \int I dt dt - \overline{b}_2 \int_O^{P_1,R_1} \overline{H}_2 \cdot \int I dt dt$$

Therein I is the unity matrix. Note that inside the integral, a vector dot-product is evaluated, resulting in a scalar. As the bias-vector is taken outside the integrals, the unity matrix is required to make sure the calculations are done in the correct order.

Therewith the difference reduces to:

$$m_1 - m_2 = \overline{b}_1 \cdot \overline{\phi}_1 - \overline{b}_2 \cdot \overline{\phi}_2 \quad (1)$$

The coefficients $\overline{\phi}_1$ and $\overline{\phi}_2$ are calculated by the second auxiliary integration unit 6d of each of the navigation devices 2a, 2b.

Both vehicles also estimate their position within the INS using the first integration unit 6a. In this connection the following relation applies.

$$\overline{p}_1^1 = \int_O^{P_1,L_1} \int (\overline{a}_1^t + \overline{b}_1) dt dt = \int_O^{P_1,L_1} \int \overline{a}_1^t dt dt + \int_O^{P_1,L_1} \int \overline{b}_1 dt dt$$

And likewise:

$$\overline{p}_1^2 = \int_O^{P_1,R_1} \int \overline{a}_2^t dt dt + \int_O^{P_1,R_1} \int \overline{b}_2 dt dt$$

Therein $\overline{p}_1^1$ and $\overline{p}_1^2$ respectively are the position estimations of vehicles 1 and 2 at position $P_1$.

The difference between these two position indications is:

$$\overline{p}_1^1 - \overline{p}_1^2 = \int_O^{P_1,L_1} \int \overline{a}_1^t dt dt - \int_O^{P_1,R_1} \int \overline{a}_2^t dt dt + \int_O^{P_1,L_1} \int \overline{b}_1 dt dt - \int_O^{P_1,R_1} \int \overline{b}_2 dt dt$$

Therein the first two terms evaluate to 0, so that the difference between the position indications equals:

$$\overline{p}_1^1 - \overline{p}_1^2 = \overline{b}_1 \int_O^{P_1,L_1} \int dt dt - \overline{b}_2 \int_O^{P_1,R_1} \int dt dt \quad (2)$$

$$\overline{p}_1^1 - \overline{p}_1^2 = \overline{b}_1 \cdot \alpha_1 - \overline{b}_2 \cdot \alpha_2$$

The coefficients $\alpha_1$, $\alpha_2$ are calculated with the first auxiliary integration unit 6c of each of the navigation devices 2a, 2b.

Presuming that the vehicles follow a path within a plane, then equation 2 defines a set of two equations with 4 unknown factors ($b_{1x}$, $b_{1y}$, $b_{2x}$, $b_{2y}$). In the above the start of the integration period is the time at which an encounter is detected. The end of the integration period and the start of a next integration period is the time at which a next encounter is detected. Equation 1 is 1 equation with the same four unknown factors.

A solution of the system is possible if the vehicles have a second encounter, for instance at point P2, allowing for a further evaluation of the equations 1 and 2, resulting in equations 1a, 1b, 2a, 2b.

The equations 2a, 2b for the paths from point O to $P_1$, and from $P_1$ to $P_2$ respectively result in a dependent system of 4 equations with 4 unknown factors. Therefore, the biases cannot be solved from only this system of equations. Substitution of equations 1a and 1b in this system results in an independent system allowing for solving of $\overline{b}_1$ and $\overline{b}_2$ as follows:

$$\overline{p}_1^1 - \overline{p}_1^2 = \overline{b}_1 \cdot \alpha_1^1 - \overline{b}_2 \cdot \alpha_1^2$$

$$\overline{p}_2^1 - \overline{p}_2^2 = \overline{b}_1 \cdot \alpha_2^1 - \overline{b}_2 \cdot \alpha_2^2$$

$$m_1^1 - m_1^2 = \overline{b}_1 \cdot \overline{\phi}_1^1 - \overline{b}_2 \cdot \overline{\phi}_1^2$$

$$m_2^1 - m_2^2 = \overline{b}_1 \cdot \overline{\phi}_2^1 - \overline{b}_2 \cdot \overline{\phi}_2^2$$

This set of 6 equations with 4 independent equations conforms to $$\overline{y} = M \cdot \begin{pmatrix} \overline{b}_1 \\ \overline{b}_2 \end{pmatrix}$$

To that end the navigation devices 2a, 2b exchange the calculated navigation data with each other. I.e. navigation device 2a uses its communication unit 10 to transmit its calculated navigation data $\overline{p}_1^1$, $\overline{p}_2^1$, $m_1^1$, $m_2^1$, $\alpha_1^1$, $\alpha_2^1$, $\overline{\phi}_1^1$, $\overline{\phi}_2^1$ to the second navigation device 2b, and the second navigation device 2b on its turn transmits its calculated navigation data $\overline{p}_1^2$, $\overline{p}_2^2$, $m_1^2$, $m_2^2$, $\alpha_1^2$, $\alpha_2^2$, $\overline{\phi}_1^2$, $\overline{\phi}_2^2$ to the first navigation device 2a. The navigation devices 2a, 2b store their own calculated navigation data as well as the calculated navigation data received from the other navigation device into the storage unit 7. The matrix solving unit 8 then uses this information to estimate the biases in the navigation devices.

Figure 7:
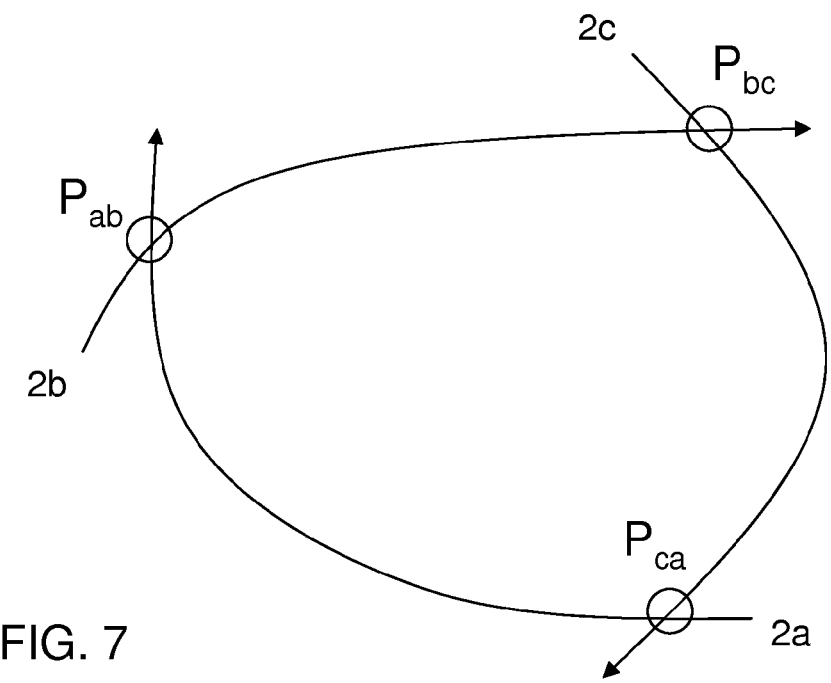
FIG. 7 illustrates an operation of a navigation system having more than two navigation devices.

Cooperative navigation in a navigation system according to the first aspect of the present invention is not restricted to a number of two mutually cooperating navigation devices. It is sufficient that a substantially closed path can be composed of individual paths of the navigation devices. FIG. 7 illustrates this principle for a navigation system with three navigation devices 2a, 2b, 2c. Therein navigation device 2a encounters navigation device 2b in point $P_{ab}$, navigation device 2b encounters navigation device 2c in point $P_{bc}$, and navigation device 2c encounter navigation device 2a in point $P_{ca}$. Now the concatenation of the path portion of navigation device 2a from point $P_{ca}$ to point $P_{ab}$, the path portion of navigation device 2b from point $P_{ab}$ to point $P_{bc}$, and the path portion of navigation device 2c from point $P_{bc}$ to point $P_{ca}$ is a substantially closed path. A path is considered to be substantially closed if in case of a single navigation device an encounter with the same reference point is detected at the beginning and end of the path portion.

A concatenated path is considered closed if it comprises a plurality of path portions wherein each of the path portions is related to a subsequent path portion by a detected encounter and wherein the last path portion has the first path portion as its successor.

Given such a substantially closed path, Ampere's integral can be calculated by the sum of the integrals for each of the path portions, analogous in the way this sum is calculated for navigation system comprising two navigation devices.

Generally speaking, for a plurality of navigation devices a plurality of independent paths may be identified. Assume for example that each of the navigation devices departed from an origin O, then at least the additional closed paths O, $P_{ab}$, $P_{ca}$; O, $P_{ab}$, $P_{bc}$ and O, $P_{bc}$, $P_{ca}$ are available. Accordingly the path integral computed for these paths may additionally be used in the computation.

Figure 8:
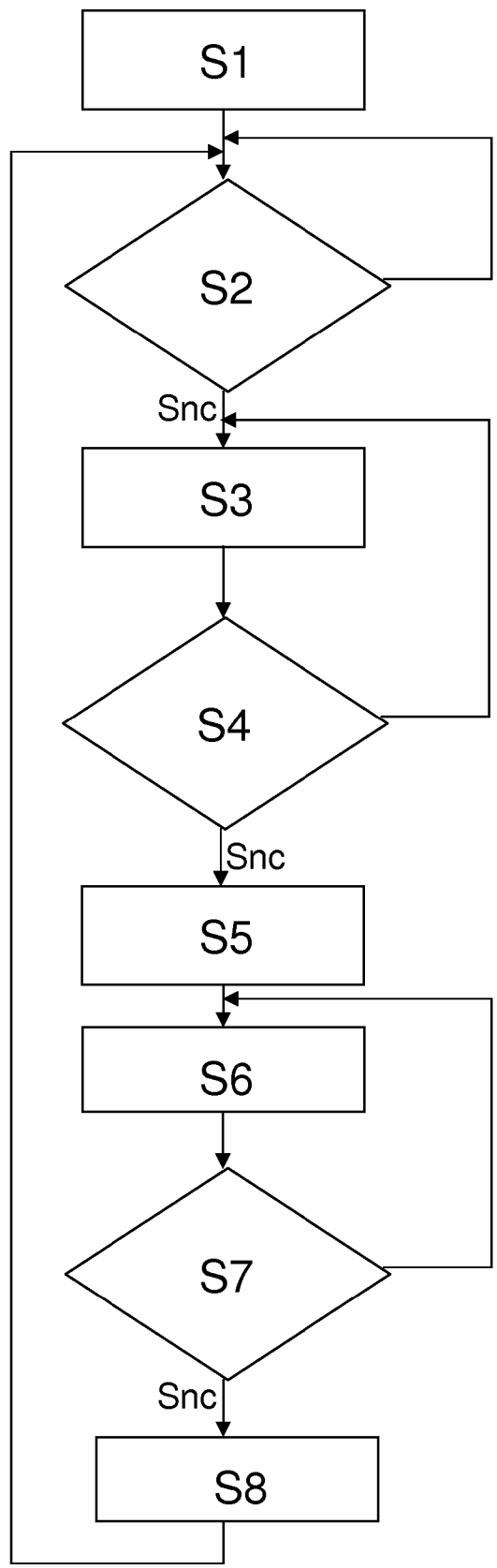
FIG. 8 illustrates operation of a part of the navigation device of FIG. 5, FIG. 9 schematically illustrates a third embodiment of a navigation system according to the first aspect of the invention, FIG. 10 schematically illustrates a second embodiment of a navigation device according to the second aspect of the invention, applicable in the navigation system of FIG. 9, FIG. 11 schematically illustrates a first embodiment of a navigation server according to the third aspect of the invention, applicable in de navigation system of FIG. 9, FIG. 12 schematically illustrates a fourth embodiment of a navigation system according to the first aspect of the invention, FIG. 13 schematically illustrates a third embodiment of a navigation device according to the second aspect of the invention, applicable in the navigation system of FIG. 12, FIG. 14 schematically illustrates a second embodiment of a navigation server according to the third aspect of the invention, applicable in de navigation system of FIG. 12, FIG. 15A, 15B illustrate a fifth embodiment of a navigation system according to the first aspect of the invention.

FIG. 8 schematically illustrates operation of the controller 9. S1 represents start-up of the device is initialized. Therein the integrators 6a, 6b, 6c, 6c may be set to a proper initial value. In step S2 the device awaits the signaling Snc by the proximity detector 5 of an encounter with another navigation device. The signal Snc of the encounter defines the start of an integration period that is carried out in step S3. The position where the navigation devices 2a, 2b first encounter each other may be considered as the origin O in FIG. 6. A further signal Snc from the proximity detector 5 is awaited in step S4. As long as no further encounter signal Snc is received, the integration in step S3 is continued. Once a further encounter signal Snc is received process flow continues with step S5. In step S5 the integration result of the integrators 6a, 6b, 6c, 6c is stored in the storage unit 7 and transmitted to the other navigation device 2b. The navigation device further receives corresponding integration results from the other navigation device 2b and stores this in the storage facility 7. At the time of receiving the further encounter Snc a further integration period is started in S6 that continues until again a further encounter is detected in step S7. When indeed a further encounter is detected in step S7, program flow continues with step S8. In step S8 the integration result of the integrators 6a, 6b, 6c, 6c is stored in the storage facility 7 and transmitted to the other navigation device 2b. The navigation device further receives corresponding integration results from the other navigation device 2b and stores this in the storage facility 7. Subsequent thereto, the controller 9 activates the matrix solving unit 8 to estimate the bias of the navigation device on the basis of the data now available in the storage facility 7. The controller may subsequently repeat these steps from S2, to make a further estimation.

In a navigation system with two navigation devices it is sufficient if only one thereof is provided with a proximity detector and signal its detection to the other navigation device. Nevertheless each of the navigation devices may have a proximity detector. If a navigation device detects an encounter it may verify whether the encounter can be confirmed by the other navigation device. In case of a navigation system with more than two navigation devices the navigation devices may upon encounter exchange each others identity. Alternatively the navigation devices may recognize each others identity from a visible mark or color code for example.

Figure 9:
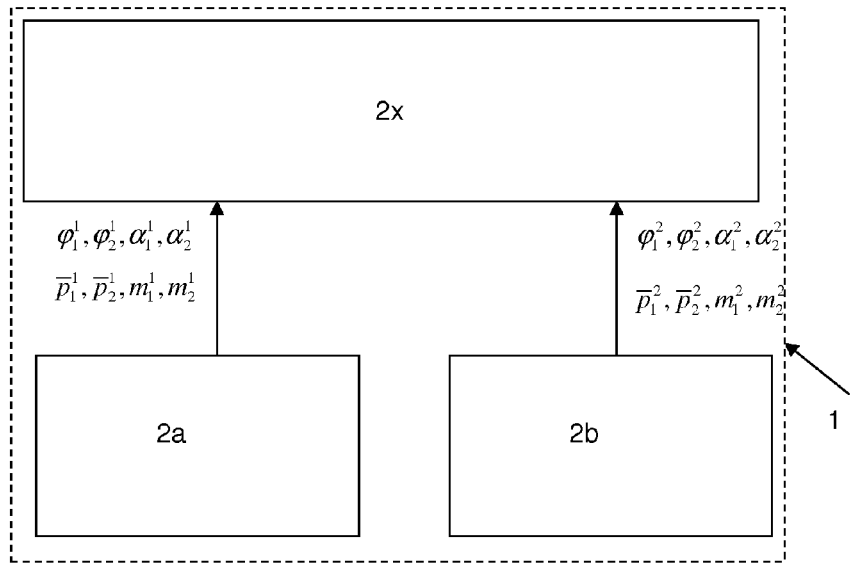
Figure 10:
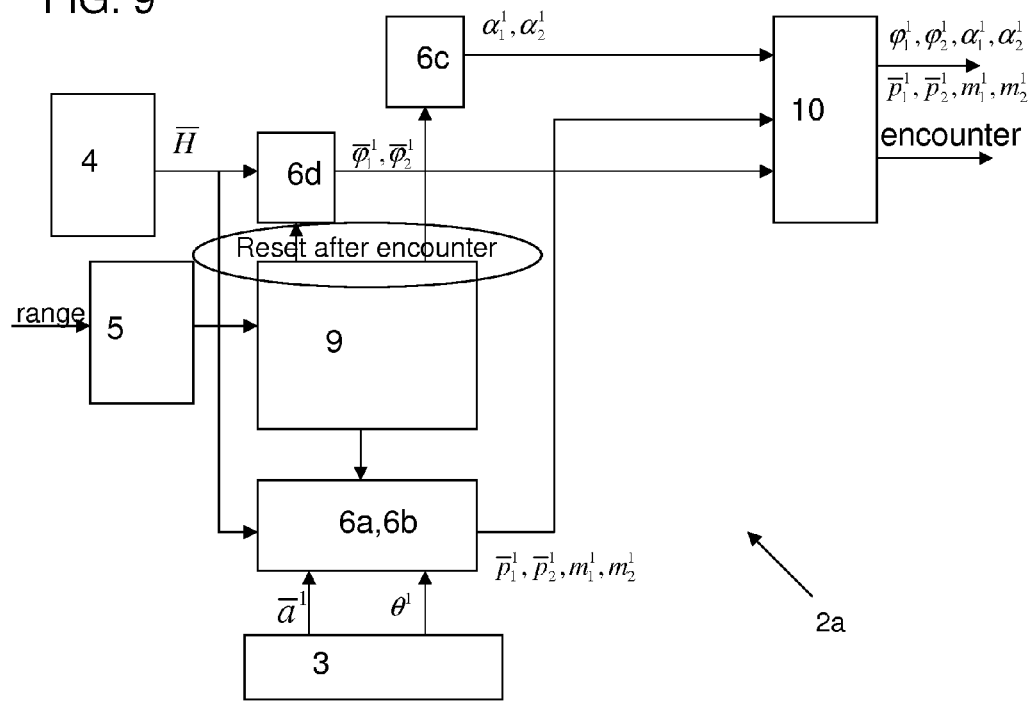
Figure 11:
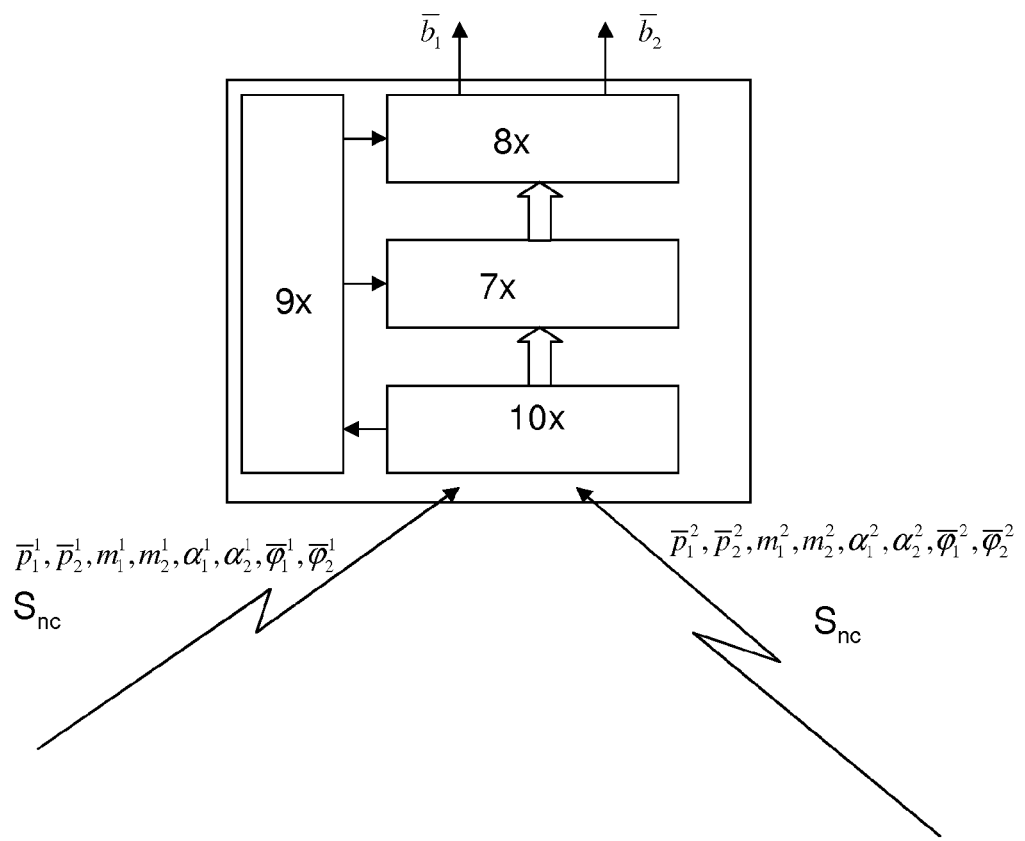

It is not necessary that the participating navigation devices each comprise full computational ability. For example FIG. 9 schematically illustrates a navigation system 1 comprising a navigation server 2x, as well as a first and a second navigation device 2a, 2b. In this embodiment the navigation devices 2a (See FIG. 10), 2b differ from the navigation devices described with reference to FIG. 5, in that they do not have an storage unit 7 and a matrix solving unit 8. These facilities 7, 8 are implemented by the navigation server 2x, shown in detail in FIG. 11. During operation of the navigation system 1, the navigation devices 2a, 2b transmit their calculated navigation information, as well as an information $S_{nc}$ indicative that an encounter has occurred to the navigation server 2x. The navigation server 2x receives this information with a communication unit 10x and stores the calculated navigation information in its storage unit 7x. When sufficient information has been gathered in the storage unit 7x, the matrix solving unit 8x is activated by the controller 9x.

Figure 12:
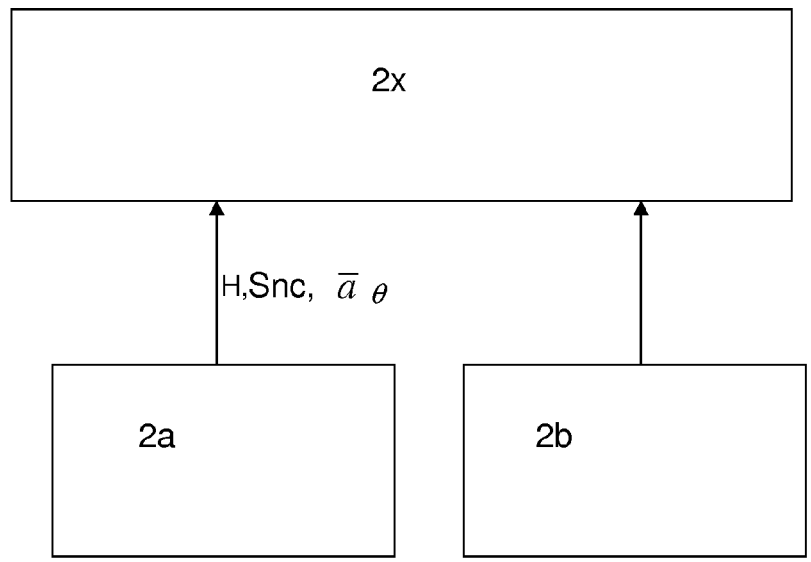
Figure 13:
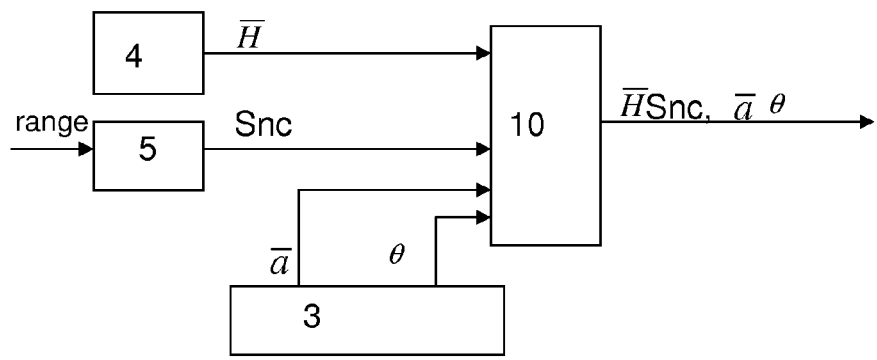
Figure 14:
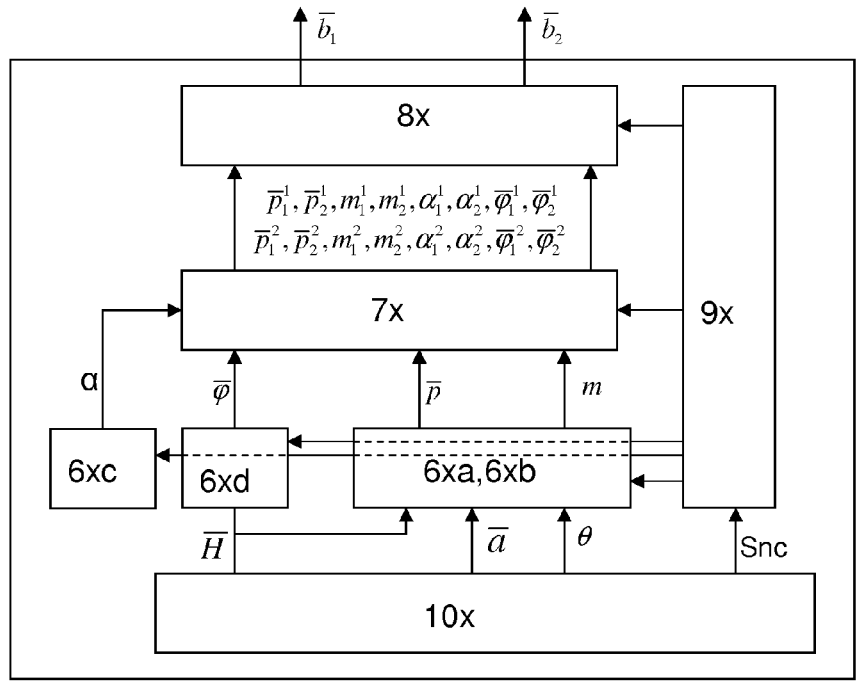

Even more computation capabilities may be carried out by the navigation server. This is illustrated with reference to FIGS. 12, 13 and 14. As in the embodiment described with reference to FIGS. 9,10 and 11, the navigation system 1 (FIG. 12) comprises a navigation server 2x (FIG. 14) and navigation devices 2a (FIG. 13), 2b. As shown in FIG. 13 however, in this embodiment the navigation devices 2a, 2b merely provide for the raw sensing data. In this case the communication unit 10 of the navigation device 2a transmits the sensor signals $\bar{\alpha}$, $\theta$ indicative respectively for the measured acceleration and the measured orientation, the signal H indicative for the magnetic field and the signal Snc indicating whether an encounter has been detected or not. These signals are received by the communication device 10x of the navigation server 2x. The navigation server is provided with a first integration unit 6xa for integrating the navigation signal, i.e. the measured acceleration $\bar{a}$ and for providing a first integration result $\bar{p}$. The navigation server is further provided with a second integration unit 6xb for calculating a path-integral m of the magnetic field signal H using the navigation signal $\bar{\alpha}$, and for providing a second integration result m. It is noted that the navigation signal may alternatively be a measurement signal indicative for a velocity, e.g. from an odometer. The navigation server further includes a first auxiliary integration unit 6xc for providing a first coefficient α and a second auxiliary integration unit 6xd for providing a second coefficient $\bar{\phi}$.

The navigation server further includes a data storage unit 7x for storing the first integration result $\bar{p}$, the second integration result m, the first coefficient and the second coefficient for states wherein the proximity signal is positive. The navigation server further includes a matrix solving unit for solving a set of equations based on the first integration result, the second integration result, the first coefficient α and the second coefficient $\bar{\phi}$ retrieved from the data storage unit 7x. The navigation server 2x further includes a controller 9x for controlling the first integration unit 6xa, the second integration unit 6xb, the first auxiliary integration unit 6xc, the second auxiliary integration unit data storage unit 6xd, the data storage unit 7x and the matrix solving unit 8x.

It is an advantage of this embodiment that all computational facilities are shared. A single set of the computational facilities is sufficient for a plurality of navigation devices. The computational facilities may be formed by a general purpose processor or by dedicated hardware.

Figure 15A:
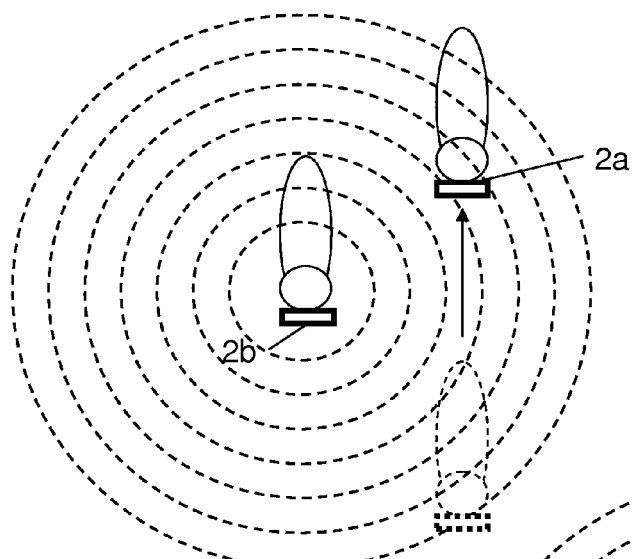
Figure 15B:
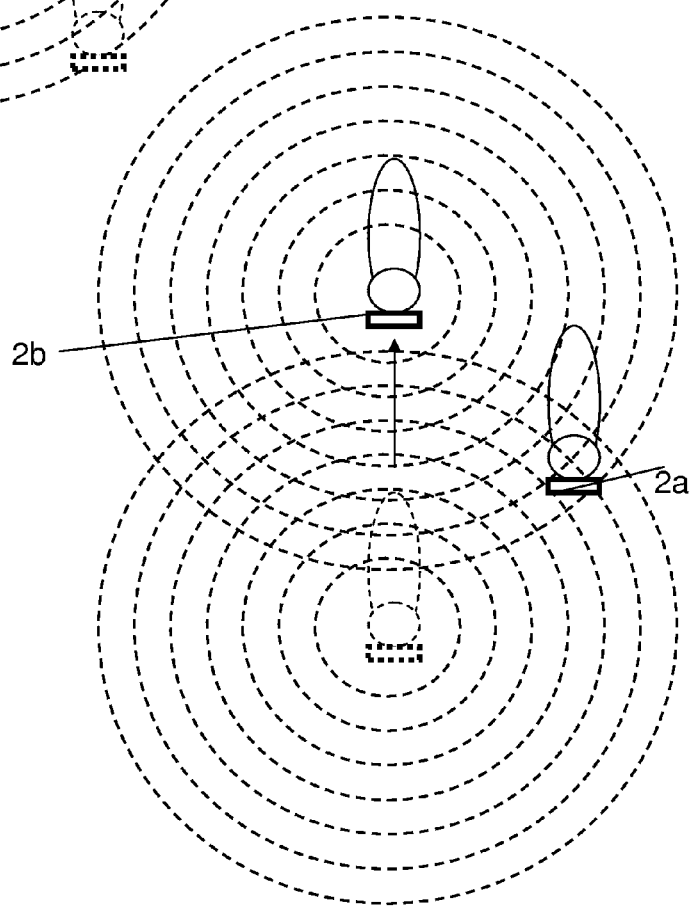

With reference to FIGS. 15A and 15B a further embodiment is described wherein the navigation system comprises a first 2a and a second, further, navigation device 2b.

By way of example, in this embodiment the first navigation device 2a is attached to the right foot or ankle of a person and the further navigation device is attached to the left foot or ankle. The further navigation device 2b is provided with a magnet, with for instance a pole field strength of 0.5 T and directed such that maximal field strength variation is obtained in the region the right foot with navigation device 2a is moving. The further navigation device 2b does not need to have a magnetometer.

For this embodiment it is presumed that the velocity is relatively low so that the radiation effects of the magnet are negligible. For human walking, this assumption is always met. It is further assumed that person moves by alternately stepping with one feet and alternatively keeping the other feet motionless. (i.e. slipping of the feet and jumping movements are excluded.) It is detected when the feet are put down, e.g. by using a switch in the shoe, pressure sensors or proper processing of the acceleration sensors.

This embodiment is also applicable to a situation where the navigation devices 2a, 2b are carried by a vehicle, wherein the vehicles alternately stop while the other continues.

FIG. 15A illustrates a step by the right foot. The navigation device 2a attached to the right ankle measures and integrates the acceleration by the right foot. Additionally Ampere's path integral is determined by:

$$Y_R = \int \overline{H}_{R1}^i \int_{T1}^{T2} (\overline{a}_{tR}^i + \overline{a}_{bR}^i) dt dt$$

In which both the magnetic field and the true acceleration are in general functions of time.

The integration period has a duration from the moment T1 that the right foot starts to move to the moment T2 that the right foot is put down again. Subsequently the left foot is displaced as illustrated in FIG. 15B. The left foot navigation device 1b measures its acceleration $\overline{a}$ and orientation $\theta$ and communicates these signals to the navigation device 1a at the right foot. Again the integrals for acceleration and Ampere's path integral are evaluated by the navigation device 1a attached to the right foot. However, the magnetic field of at the position of the right foot is selected as the magnetic field to be integrated in the path integral.

$$Y_L = \int \overline{H}_{L1}^i \int_{T1}^{T2} (\overline{a}_{tL}^i + \overline{a}_{bL}^i) dt dt$$

Under the previously mentioned assumptions, when the left foot moves, the same magnetic field measurements are obtained by navigation device 1a of the right foot as if the right foot is moving in exactly opposite direction with respect to the left foot if it was standing still. So, the same measurement signals would be obtained as if the right foot was moving forward and backward with respect to the left foot standing still. Moving forward and backward with one foot obviously results in an approximately closed curve and evaluating Amperes integral yields an approximate zero result.

In general, such a combination of two relative trajectories is physically only meaningful if one of the axis systems is a non-accelerating axis system during the acceleration of the other. This requirement is obviously met if one foot is standing still during the movement of the other.

As the both feet never follow the same trajectory (or if two vehicles follow two non-equal trajectories) this implies that $\overline{H}_{R1}^i \neq \overline{H}_{R2}^i$ After the first step by the right foot and the first step by the left foot, the both feet approximately assume the same relative position.

This implies $$Y_L - Y_R = \oint \overline{H}_{R2}^i \int_{T2}^{T3} \overline{a}_L^i dt dt - \oint \overline{H}_{R1}^i \int_{T1}^{T2} \overline{a}_{tR}^i dt dt + \\ \oint \overline{H}_{R2}^i \int_{T2}^{T3} \overline{a}_{bL}^i dt dt - \oint \overline{H}_{R1}^i \int_{T1}^{T2} \overline{a}_{bR}^i dt dt$$

According to Ampere's law the first two terms are approximately 0. The other terms result in an independent equation of the general form:

$$m_1^1 - m_1^2 = \overline{b}_1 \cdot \overline{\phi}_1^1 - \overline{b}_2 \cdot \overline{\phi}_1^2$$

This equation can be used to determine $\overline{b}_1, \overline{b}_2$

Figure 16:
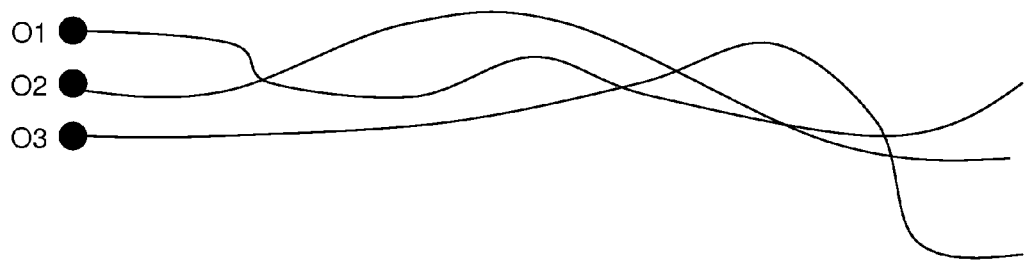
FIG. 16 illustrates operation of a navigation system comprising a plurality of navigation devices.

In a further application two or more carriers each carry a navigation device as described with reference to FIG. 16, The carriers globally follow a common trajectory, but locally deviate from the trajectory, such that it on average may be assumed that two trajectories define a closed path at all times. Such an assumption implies that the two trajectories are common trajectories on the average. This model applies for example to a situation wherein firemen enter a building two by two and as a team always stay close together. Alternatively the carriers may for example be (automatically controlled) vehicles.

At each moment the paths followed by an arbitrary pair O1, O2; O2, O3 or O1, O3 of the objects define a closed curve.

Each object has a navigation device that evaluates the path-integral of Ampere. A combination of the path-integral for two objects results in:

$$m(t) = Y_1(t) - Y_2(t) = \gamma_1(t) \cdot \overline{a}_{b1}^b + \phi_1(t) \cdot \overline{a}_{b1}^i - \gamma_2(t) \cdot \overline{a}_{b2}^b - \phi_2(t) \cdot \overline{a}_{b2}^i$$

At each point in time this results in an equation. From a set of these equations the biases can be estimated:

$$m(t1) = \gamma_1(t1) \cdot \overline{a}_{b1}^b + \phi_1(t1) \cdot \overline{a}_{b1}^i - \gamma_2(t1) \cdot \overline{a}_{b2}^b - \phi_2(t1) \cdot \overline{a}_{b2}^i$$

$$m(t2) = \gamma_1(t2) \ldots$$

$$m(t3) = \gamma_1(t3) \ldots$$

This set of equations has the general form:

$$\overline{m} = A \cdot \overline{b}$$

Wherein:

$$\overline{b} = \begin{pmatrix} \overline{a}_{b1}^b \\ \overline{a}_{b1}^i \\ \overline{a}_{b2}^b \\ \overline{a}_{b2}^i \end{pmatrix}, \overline{m} = \begin{pmatrix} m(t1) \\ m(t2) \\ m(t3) \\ \ldots \end{pmatrix}, A = \begin{pmatrix} \gamma_1(t_1) & \varphi_1(t_1) & \gamma_2(t_1) & \varphi_2(t_1) \\ \gamma_1(t2) & \varphi_1(t2) & \ldots & \ldots \\ \gamma_1(t3) & \ldots & \ldots & \ldots \\ \vdots & \vdots & \vdots & \vdots \end{pmatrix}$$

This embodiment requires that during the trajectories the magnetic fields vary among the navigating devices. I.e. the carriers should experience mutually different magnetic fields. Accordingly this method for correction is particularly suitable for cooperative navigation in buildings, where usually magnetic field perturbing features are present, such as metal carriers and metal reinforcement in concrete floors. If no magnetic field variation among the objects is present, a set of dependent equations is obtained and the biases cannot be solved from this set of equations.

Figure 17:
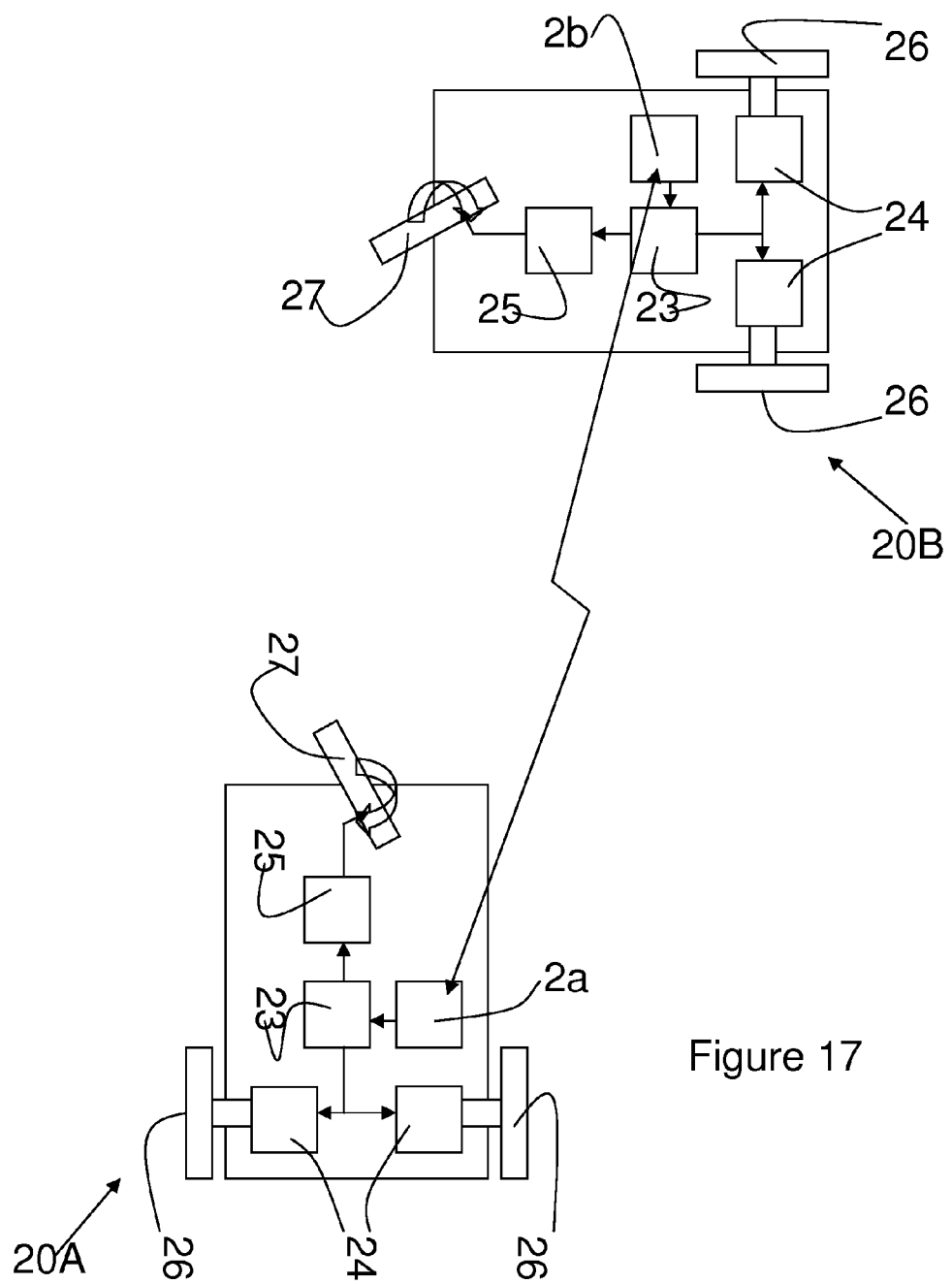
FIG. 17 illustrates a group of vehicles according to the fifth aspect of the invention.

FIG. 17 shows a group of vehicles. For clarity only a first 20A and a second vehicle 20B are shown. Each of the vehicles 20A, 20B comprises a navigation device 2a, 2b respectively, as well as a drive mechanism 24 and steering mechanism 25 controlled by the navigation device 2a, 2b, via a control unit 23. The control unit 23 uses navigation information retrieved from the navigation device 2a, 2b to control a driving speed with which the drive mechanism 24 drives back-wheels and to control an orientation imposed by the steering mechanism 25 on the front wheel 27.

Summarizing, a navigation system is disclosed comprising a navigation device 2a with a navigation sensor unit 3 and a magnetic field sensor unit 4, the navigation device is arranged to be moved. The navigation sensor unit 3 is arranged for providing a navigation signal with navigation information $\bar{a}$, $\theta$. The magnetic field sensor unit is arranged for providing a magnetic field signal H indicative for a magnetic field strength. The navigation system further comprises a first integration unit 6a for integrating the navigation signal $\bar{a}$, $\theta$ and for providing a first integration result p, a second integration unit 6b for calculating a path-integral of the magnetic field signal using the navigation signal, and for providing a second integration result m, a first auxiliary integration unit 6c for providing a first coefficient $\alpha$, a second auxiliary integration unit 6d for providing a second coefficient $\phi$, and a proximity detector 5 for providing a proximity signal Snc indicative whether a distance between the navigation device 2a and a reference position is less than a predetermined value. A matrix solving unit 8 for solves a set of equations based on the first integration result, the second integration result, the first coefficient and the second coefficient. In the navigation system and method according to the present invention the evaluation of Ampere's integral provides for additional navigation information, that either can be used to estimate a bias in the navigation where otherwise insufficient information for such estimation would be available or to improve an estimation. The estimation of the bias may be used to indicate the reliability of the position detection and/or to improve the position detection.

In the claims the word "comprising" does not exclude other elements or steps, and the indefinite article "a" or "an" does not exclude a plurality. A single component or other unit may fulfill the functions of several items recited in the claims. The mere fact that certain measures are recited in mutually different claims does not indicate that a combination of these measures cannot be used to advantage. Any reference signs in the claims should not be construed as limiting the scope. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The invention claimed is:
1. Navigation system comprising
a navigation device with a navigation sensor unit and a magnetic field sensor unit, the navigation device being arranged to be moved,
the navigation sensor unit being arranged for providing a navigation signal with navigation information $(\bar{\alpha},\theta)$
the magnetic field sensor unit being arranged for providing a magnetic field signal (H) indicative for a magnetic field strength,
a first integration unit for integrating the navigation signal $(\bar{\alpha},\theta)$ and for providing a first integration result (p),
a second integration unit for calculating a path-integral of the magnetic field signal using the navigation signal, and for providing a second integration result (m),
a first auxiliary integration unit for providing a first coefficient $(\alpha)$,
a second auxiliary integration unit for providing a second coefficient $(\phi)$,
a proximity detector for providing a proximity signal (Snc) indicative whether a distance between the navigation device and a reference position is less than a predetermined value,
a data storage unit for storing the first integration result, the second integration result, the first coefficient and the second coefficient for states wherein the proximity signal is positive,
a matrix solving unit for solving a set of equations based on the first integration result, the second integration result, the first coefficient and the second coefficient retrieved from the data storage unit,
a controller for controlling the first integration unit, the second integration unit, the first auxiliary integration unit, the second auxiliary integration unit data storage unit, the data storage unit and the matrix solving unit.

2. Navigation system according to claim 1, wherein
the first integration result $(\overline{p})$ is an estimated position,
the second integration result (m) is Ampere's integral of the magnetic field signal $(\overline{H})$ along the path $(O_1\text{-}O_2)$ followed by the navigation system as estimated on the basis of the navigation signal $(\overline{\alpha},\theta)$,
the first auxiliary integration unit obtains the first coefficient $(\alpha)$ by a double integration of a normalization constant in time over a time-interval $(T_1\text{-}T_2)$ in which the estimated path was followed,
the second auxiliary integration unit is arranged for
integrating a normalization constant (I) in time over said time-interval,
for multiplying an integration result obtained therewith by the measured magnetic field (H) and
for integrating the product obtained therewith in time over said time-interval, wherein the integration result of this integration is the second coefficient $(\overline{\phi})$,
wherein the set of equations includes at least a first equation in which the estimated position $(p_1^{\ 1})$ is expressed as the product of the first coefficient $(\alpha)$ with a bias $(\overline{b})$ in the acceleration, and a second equation wherein Ampere's integral is expressed as the product of said bias $(\overline{b})$ with the second coefficient $(\overline{\phi})$, and
wherein the matrix solving unit estimates said bias by solving the set of equations.

3. Navigation system according to claim 2, comprising at least one beacon, and wherein the reference position is the position of the beacon.

4. Navigation system according to claim 2, comprising at least a further navigation device arranged to be moved, wherein the reference position is the position of the further navigation device.

5. Navigation system according to claim 4, wherein the further navigation device is provided with a facility for providing a magnetic field.

6. Navigation system according to claim 2, wherein the navigation sensor unit comprises an inertial sensor.

7. Navigation system according to claim 2, comprising a third reference integration unit for integrating the product of the magnetic field signal with the rotation matrix.

8. Navigation system according to claim 1, comprising at least one beacon, and wherein the reference position is the position of the beacon.

9. Navigation system according to claim 1, comprising at least a further navigation device arranged to be moved, wherein the reference position is the position of the further navigation device.

10. Navigation system according to claim 9, wherein the further navigation device is provided with a facility for providing a magnetic field.

11. Navigation system according to claim 1, wherein the navigation sensor unit comprises an inertial sensor.

12. Navigation system according to claim 1, comprising a third reference integration unit for integrating the product of the magnetic field signal with the rotation matrix.

13. Navigation device comprising
a navigation sensor unit, a magnetic field sensor unit, and a proximity detector, wherein the navigation device is arranged to be moved,
the navigation sensor unit being arranged for providing a navigation signal,
the magnetic field sensor unit being arranged for providing a magnetic field signal indicative for a magnetic field strength,
the proximity detector being arranged for providing a proximity signal (Snc) indicative whether a distance between the navigation device and a reference position is less than a predetermined value, and
further comprising
a first integration unit for integrating the navigation signal and for providing a first integration result (p),
a second integration unit for calculating a path-integral of the magnetic field signal using the navigation signal, and for providing a second integration result (m),
a first auxiliary integration unit for providing a first coefficient ($\alpha$),
a second auxiliary integration unit for providing a second coefficient ($\phi$).

14. Navigation device according to claim 13, further comprising a communication unit, wherein the communication unit of the navigation device transmits the sensor signals $\bar{a},\theta$ indicative respectively for the measured acceleration and the measured orientation, the signal (H) indicative for the magnetic field and the signal (Snc) indicating whether an encounter has been detected or not.

15. Navigation device according to claim 13, wherein
the first integration result ($\bar{p}$) is an estimated position,
the second integration result (m) is Ampere's integral of the magnetic field signal ($\bar{H}$) along the path ($O_1$-$O_2$) followed by the navigation system as estimated on the basis of the navigation signal ($\bar{a},\theta$),
the first auxiliary integration unit obtains the first coefficient ($\alpha$) by a double integration of a normalization constant in time over a time-interval ($T_1$-$T_2$) in which the estimated path was followed,
the second auxiliary integration unit is arranged for
integrating a normalization constant (I) in time over said time-interval,
for multiplying an integration result obtained therewith by the measured magnetic field (H) and
for integrating the product obtained therewith in time over said time-interval, wherein the integration result of this integration is the second coefficient ($\bar{\phi}$),
wherein the set of equations includes at least a first equation in which the estimated position ($p_1^1$) is expressed as the product of the first coefficient ($\alpha$) with a bias ($\bar{b}$) in the acceleration, and a second equation wherein Ampere's integral is expressed as the product of said bias ($\bar{b}$) with the second coefficient ($\bar{\phi}$), and
wherein the matrix solving unit (8) estimates said bias by solving the set of equations.

16. Navigation server comprising
a data storage unit for storing a first integration result obtained from a first integration unit for integrating a navigation signal, a second integration result obtained from a second integration unit for calculating a path-integral of the magnetic field signal using the navigation signal, a first coefficient obtained from a first auxiliary integration unit and a second coefficient obtained from a second auxiliary integration unit,
a matrix solving unit for solving a set of equations based on the first integration result, the second integration result, the first coefficient and the second coefficient retrieved from the data storage unit,
a controller for controlling the first integration unit, the second integration unit, the first auxiliary integration unit, the second auxiliary integration unit, the data storage unit and the matrix solving unit.

17. Navigation server according to claim 16, wherein
the first integration result ($\bar{p}$) is an estimated position,
the second integration result (m) is Ampere's integral of the magnetic field signal ($\bar{H}$) along the path ($O_1$-$O_2$) followed by the navigation system as estimated on the basis of the navigation signal ($\bar{a},\theta$),
the first auxiliary integration unit obtains the first coefficient ($\alpha$) by a double integration of a normalization constant in time over a time-interval ($T_1$-$T_2$) in which the estimated path was followed,
the second auxiliary integration unit is arranged for
integrating a normalization constant (I) in time over said time-interval,
for multiplying an integration result obtained therewith by the measured magnetic field (H) and
for integrating the product obtained therewith in time over said time-interval, wherein the integration result of this integration is the second coefficient ($\bar{\phi}$),
wherein the set of equations includes at least a first equation in which the estimated position ($p_1^1$) is expressed as the product of the first coefficient ($\alpha$) with a bias ($\bar{b}$) in the acceleration, and a second equation wherein Ampere's integral is expressed as the product of said bias ($\bar{b}$) with the second coefficient ($\bar{\phi}$), and
wherein the matrix solving unit estimates said bias by solving the set of equations.

18. Vehicle provided with a navigation device comprising
a navigation sensor unit, a magnetic field sensor unit, and a proximity detector, wherein the navigation device is arranged to be moved,
the navigation sensor unit being arranged for providing a navigation signal,
the magnetic field sensor unit being arranged for providing a magnetic field signal indicative for a magnetic field strength,
the proximity detector being arranged for providing a proximity signal (Snc) indicative whether a distance between the navigation device and a reference position is less than a predetermined value, and
further comprising
a first integration unit for integrating the navigation signal and for providing a first integration result (p),
a second integration unit for calculating a path-integral of the magnetic field signal using the navigation signal, and for providing a second integration result (m),
a first auxiliary integration unit for providing a first coefficient ($\alpha$), a second auxiliary integration unit for providing a second coefficient ($\phi$).

19. Group of vehicles according to claim 18, having mutually cooperating navigation devices.

20. Method for navigating comprising the steps of
providing a navigation signal with navigation information,
providing a magnetic field signal indicative for a magnetic field strength,
integrating the navigation signal and providing a first integration result (p),
determining a path integral of magnetic field signal using the navigation signal and providing a second integration result (m),
carrying out a first auxiliary integration resulting in a first coefficient ($\alpha$),
carrying out a second auxiliary integration resulting in a second coefficient ($\phi$),
providing a proximity signal indicative whether a distance between the navigation device and a reference position is less than a predetermined value,
storing the first integration result, the second integration result, the first reference integration result and the second reference integration result for states wherein the proximity is positive,
solving a set of equations based on the first integration result, the second integration result, the first reference integration result and the second reference integration result retrieved from the data storage unit.

21. Method according to claim 20, wherein
the first integration result ($\bar{p}$) is an estimated position,
the second integration result (m) is Ampere's integral of the magnetic field signal ($\bar{H}$) along the path ($O_1$-$O_2$) followed by the navigation system as estimated on the basis of the navigation signal ($\bar{a},\theta$),
the first auxiliary integration obtains the first coefficient ($\alpha$) by a double integration of a normalization constant in time over a time-interval ($T_1$-$T_2$) in which the estimated path was followed,
the second auxiliary integration comprises
integrating a normalization constant (I) in time over said time-interval,
multiplying an integration result obtained therewith by the measured magnetic field (H) and
integrating the product obtained therewith in time over said time-interval, wherein the integration result of this integration is the second coefficient ($\bar{\phi}$),
wherein the set of equations includes at least a first equation in which the estimated position ($p_1^1$) is expressed as the product of the first coefficient ($\alpha$) with a bias ($\bar{b}$) in the acceleration, and a second equation wherein Ampere's integral is expressed as the product of said bias ($\bar{b}$) with the second coefficient ($\bar{\phi}$), and wherein said bias is estimated by solving the set of equations.

* * * * *

UNITED STATES PATENT AND TRADEMARK OFFICE
CERTIFICATE OF CORRECTION

PATENT NO. : 8,700,326 B2  Page 1 of 1
APPLICATION NO. : 13/511857
DATED : April 15, 2014
INVENTOR(S) : Marcel Gregorius Anthonius Ruizenaar It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 134 days.

Signed and Sealed this

Twenty-ninth Day of September, 2015

Michelle K. Lee
*Director of the United States Patent and Trademark Office*